(12) United States Patent
Lin et al.

(10) Patent No.: US 8,817,456 B2
(45) Date of Patent: Aug. 26, 2014

(54) CONNECTION ASSEMBLY FOR DOCKING AND COMPOSITE ELECTRONIC SYSTEM

(75) Inventors: Chia-Hsien Lin, Taipei (TW); San-Feng Lin, Taipei (TW); Hui-Wen Chiu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 198 days.

(21) Appl. No.: 13/569,543

(22) Filed: Aug. 8, 2012

(65) Prior Publication Data

US 2013/0044425 A1 Feb. 21, 2013

Related U.S. Application Data

(60) Provisional application No. 61/524,054, filed on Aug. 16, 2011.

(51) Int. Cl.
*G06F 1/16* (2006.01)

(52) U.S. Cl.
USPC ............ 361/679.29; 361/679.43; 361/679.57; 361/679.58

(58) Field of Classification Search
USPC .................................................. 361/679.29
See application file for complete search history.

(56) References Cited

U.S. PATENT DOCUMENTS

| | | | | |
|---|---|---|---|---|
| 6,512,670 | B1 * | 1/2003 | Boehme et al. | 361/679.29 |
| 6,944,012 | B2 * | 9/2005 | Doczy et al. | 361/679.15 |
| 6,989,987 | B1 * | 1/2006 | Wilson et al. | 361/679.02 |
| 7,599,178 | B2 * | 10/2009 | Huang et al. | 361/679.43 |

* cited by examiner

*Primary Examiner* — Anthony Q Edwards
(74) *Attorney, Agent, or Firm* — Muncy, Geissler, Olds & Lowe, P.C.

(57) ABSTRACT

A connection assembly comprises a bracket, a linkage element, a first elastic element, a trigger element, and a second elastic element. The first elastic element is connected with the bracket and the linkage element. One end of the trigger element is fixed on the bracket. The second elastic element is connected to the trigger element and the bracket. When the electronic apparatus is not connected to the dock, the linkage element is located at a first position of the trigger element, and the first elastic element stores a first elastic force. When the electronic apparatus is connected to the dock, the trigger element receives an external force so that the second elastic element stores a second elastic force, and the first elastic element releases the first elastic force to move the linkage element to a second position of the trigger element.

13 Claims, 7 Drawing Sheets

CONNECTION ASSEMBLY FOR DOCKING AND COMPOSITE ELECTRONIC SYSTEM

CROSS REFERENCE TO RELATED APPLICATIONS

The non-provisional patent application claims priority to U.S. provisional patent application with Ser. No. 61/524,054 filed on Aug. 16, 2011. This and all other extrinsic materials discussed herein are incorporated by reference in their entirety.

BACKGROUND OF THE INVENTION

1. Field of Invention

The disclosure relates to a connection assembly, more particularly, to a connection assembly connecting to a dock and the electronic system thereof.

2. Related Art

Compared to notebook computers, tablet PCs (personal computer) with thinner and lighter volume bring users a great feeling of convenience. Besides, as science technology develops, shortcomings due to poor processing speed in the past are eliminated gradually. Hence, tablet PCs are able to meet demands of general users. However, in order to save volume, it is inevitable for tablet PCs to sacrifice the functional diversity of connecting and fixing with other peripherals. For instance, tablet PCs don't provide input device for quick operation. Therefore, for the business people, table PCs are obviously unable to satisfy normal processing requirements.

As stated above, a dock within a keyboard is compatible with a tablet PC which increases more functionality. The tablet PC connects with the dock via a connection assembly. Therefore, a good-designed connection assembly can be easily for users to connect or disconnect two parts, which enhances the efficiency in use.

SUMMARY OF THE INVENTION

A connection assembly adapted for connecting an electronic apparatus and a dock comprises a bracket, a linkage element, a first elastic element, a trigger element, and a second elastic element. The first elastic element is connected to the bracket and the linkage element. One end of the trigger element is fixed on the bracket. The second elastic element is connected to the trigger element and the bracket. When the electronic apparatus is not connected to the dock, the linkage element is located at a first position of the trigger element, and the first elastic element stores a first elastic force. When the electronic apparatus is connected to the dock, the trigger element receives an external force so that the second elastic element stores a second elastic force, and the first elastic element releases the first elastic force to move the linkage element to a second position of the trigger element.

An electronic system comprises an electronic apparatus, a dock and a connection assembly. The connection assembly connects the electronic apparatus and the dock, and the connection assembly comprises a bracket, a linkage element, a first elastic element, a trigger element, and a second elastic element. The linkage element has at least one engaging part. The first elastic element is connected to a first connecting part of the bracket and a second connecting part of the linkage element. One end of the trigger element is fixed on the bracket. The elastic element is connected to the trigger element and the bracket. When the electronic apparatus is not connected to the dock, the linkage element is located at a first position of the trigger element, and the first elastic element stores a first elastic force. When the electronic apparatus is connected to the dock, the trigger element receives an external force so that the second elastic element stores a second elastic force, and the first elastic element releases the first elastic force to move the linkage element to a second position of the trigger element.

Additionally, the connection assembly and the electronic system of the present disclosure use two elastic elements to provide elastic force, and allow the linkage element move between the first position and the second position of the trigger element. When a user connects an electronic apparatus to a dock, an external force provided by the electronic apparatus triggers the trigger element, and makes the linkage element move from the first position to the second position of the trigger element, so that the connecting part of the connection assembly automatically connects the electronic apparatus. Throughout the entire process, the user do not need to operate any control elements, users even can accomplish the connection with one hand. When the user wants to disconnect the electronic apparatus from the dock, he/she only needs to operate a control element (which is connected with the linkage element) to move the linkage element from the second position to the first position, so that the connection part separates from the electronic apparatus and the user can disconnect the electronic apparatus from the dock.

DETAILED DESCRIPTION OF THE INVENTION

A connection assembly and an electronic system in an embodiment will be disclosed in the accompanying drawings, and the same symbols denote the same components.

Figure 1:
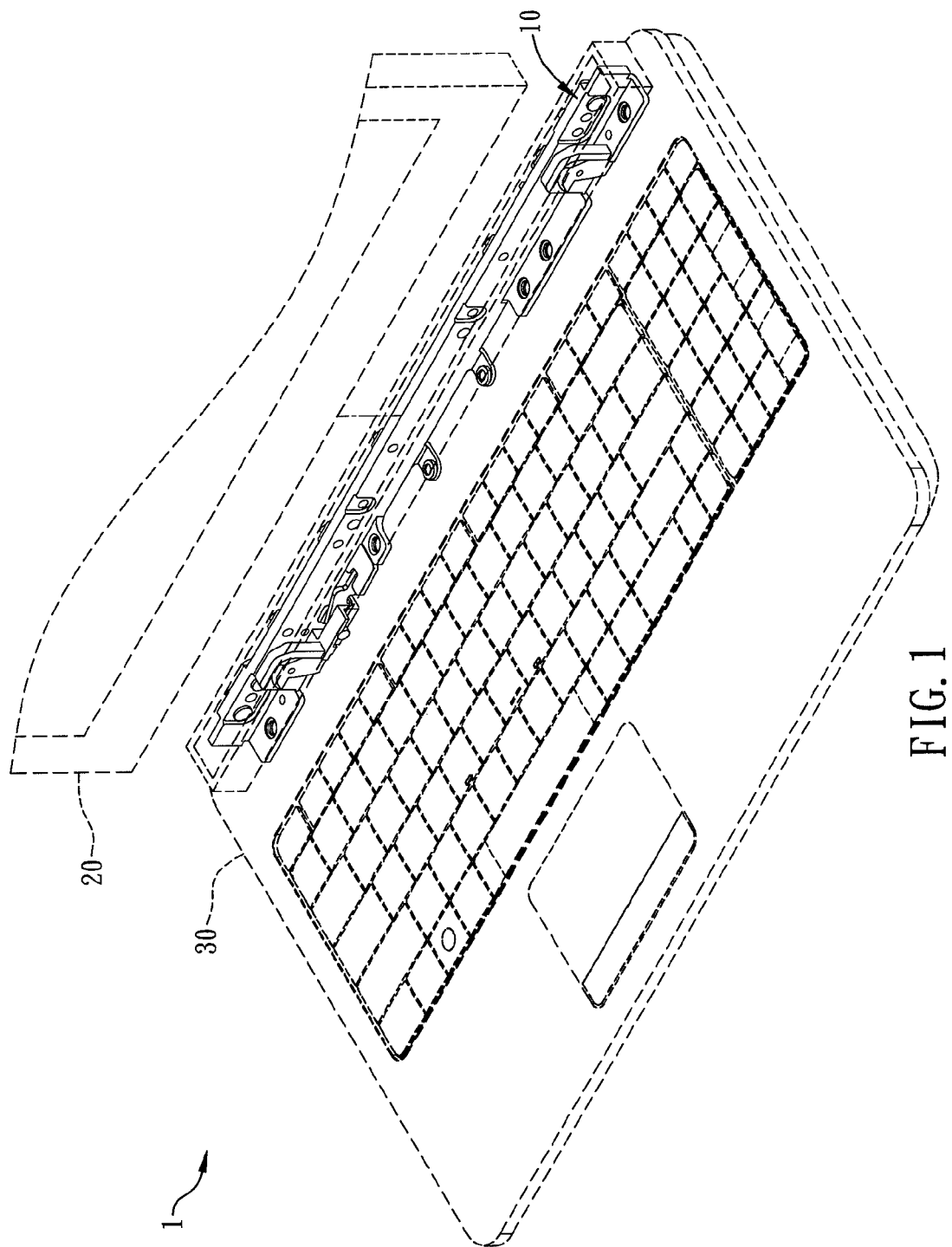
FIG. 1 is a schematic diagram showing an electronic system in an embodiment.

FIG. 1 is a schematic diagram showing an electronic system in an embodiment. As shown in FIG. 1, the electronic system 1 comprises an electronic apparatus 20, a dock 30 and a connection assembly 10. The electronic apparatus 20 may be a portable electronic apparatus, but not limited to a tablet PC, a mobile phone or a navigation device. The dock 30 is used to expand the function of the electronic apparatus 20, thus the dock 30 may be any one of the functional devices but not limited to a keyboard, a charger, a two-dimensional display or a tablet PC. In one embodiment, the electronic apparatus 20 is a tablet PC and the dock 30 is a keyboard. The connection assembly 10 is used to connect the electronic apparatus 20 and the dock 30. The connection assembly 10 has multiple connection settings, for example, it can connect directly to an electronic apparatus, or a dock, or an external base, after that the external base connects an electronic apparatus and a dock respectively. In the embodiment, the connection 10 is connected to the dock 30.

Figure 2:
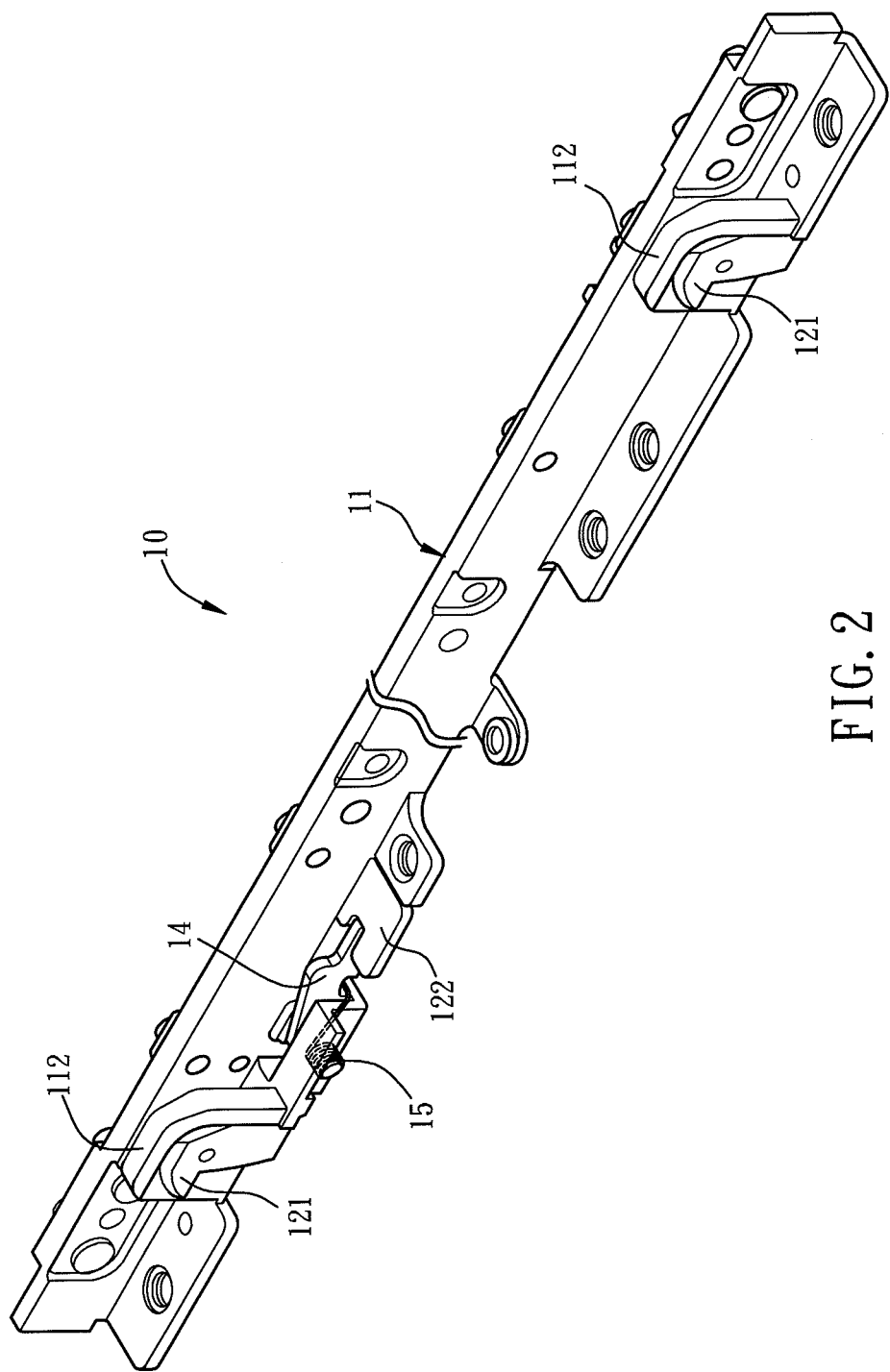
FIG. 2 is a schematic diagram showing a view of a connection assembly of an electronic system in an embodiment.
Figure 3:
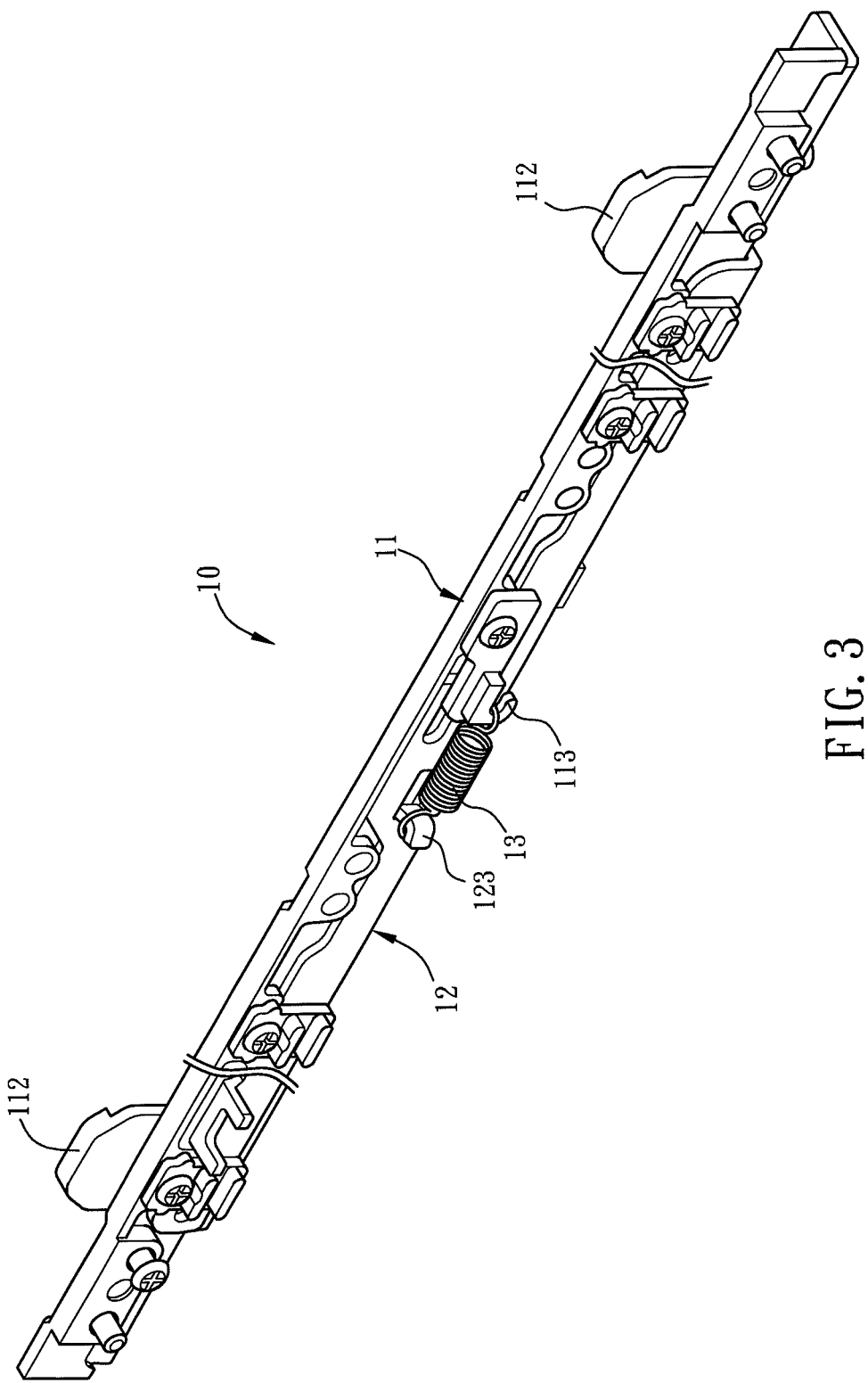
FIG. 3 is a schematic diagram showing another view of the connection assembly in FIG. 2.
Figure 4:
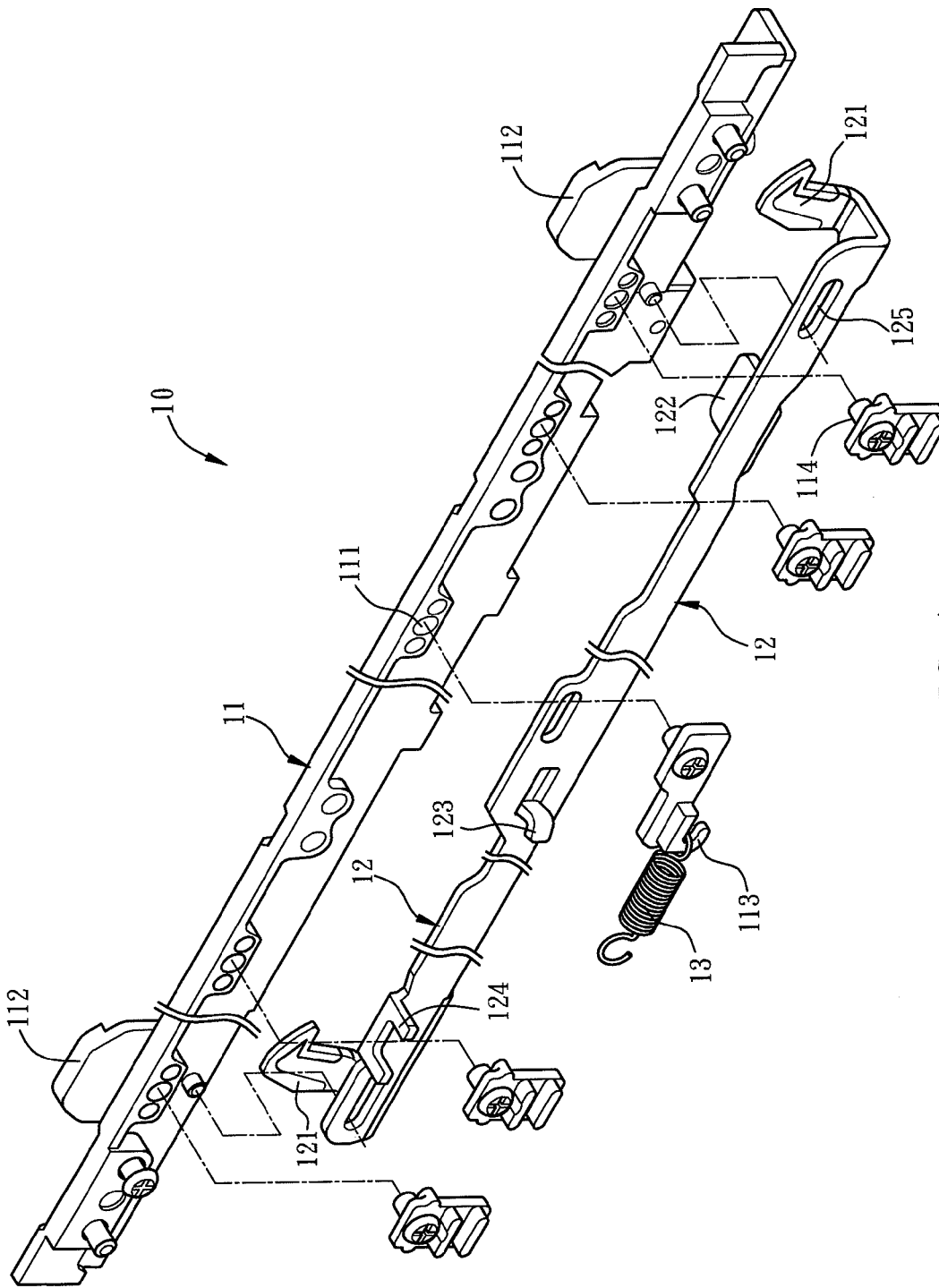
FIG. 4 is an exploded schematic diagram showing the connection assembly in FIG. 2.

FIG. 2 is a schematic diagram showing a view of a connection assembly, FIG. 3 is a schematic diagram showing another view of the connection assembly, FIG. 4 is an exploded schematic diagram showing the connection assembly. FIGS. 2-4 illustrate the structure and features of the connection assembly. The connection assembly 10 comprises a bracket 11, a linkage element 12, a first elastic element 13, a trigger element 14, and a second elastic element 15.

The bracket 11 is regarded as the backbone of the connection assembly 10. Its shape is not restricted in this disclosure. Take rectangular as an example. Moreover, the bracket 11 may have through holes, protrusions or indentation structures on its surface for more functional applications. In this embodiment, bracket 11 comprises a plurality of holes for interlocking. The bracket 11 further comprises at least one directing part 112. Two directing parts 112 are taken as an example in this embodiment. The directing part 112 is used for alignment when connecting the electronic apparatus 20. For instance, the side of the electronic apparatus 20 for connecting has two slots, so the electronic apparatus 20 can only be connected when slots are in alignment with these directing parts 112.

The linkage element 12 comprises at least one engaging part 121. In this embodiment, two engaging parts are taken for example. These two engaging parts 121 are arranged in these two directing parts 112 respectively. The engaging part 121 is used to connect the electronic apparatus 20. In this embodiment, the engaging part 121 is hook-shaped, and can be connected on the electronic apparatus 20. Additionally, the linkage element 12 further comprises a limiting part 122. The engaging part 121 and the limiting part 122 are arranged on the same side of the bracket 11. The limiting part 122 and the trigger element 14 allows the linkage element 12 located at the first position or the second position of the trigger element 14, which will be explained below.

A first elastic element may be a spring, and is connected with a first connecting part 113 of the bracket 11 and a second connecting part 123 of the linkage element 12. In this embodiment, the first connecting part 113 is locked and fixed on the bracket 11. In other embodiments, the first connecting part 113 can also be made with the linkage element 12 in one model. The second connecting part 123 can be made with the linkage element 12 in one model. In other embodiments, the second connecting part 123 may be a different component form the linkage element 12, and they may connect together via lock, weld, buckle or adhesion. In this embodiment, the first connecting part 113 and the second connecting part 123 are both with a hook structure, and the first elastic element 13 connects the first connecting part 113 and the second connecting part by these hooks.

The trigger element 14 is one of the important components that limit the movement range of the linkage element 12. One end of the trigger element 14 is fixed on the bracket 11, and a second elastic element 15 connects the trigger element 14 and the bracket 11. Here the second elastic element 15 and the first elastic element 13 are located on the opposite side of the bracket 11. When the electronic apparatus 20 is connected to the dock 30, the external force provided by the electronic apparatus 20 (for example, its gravity) passes to the trigger element 14 directly or indirectly and makes the trigger element 14 move. Herein, when the trigger element 14 receives an external force, it pivots at the end that is fixed on the bracket 11, so that it briefly departs form the limiting part 122 of the linkage element 12.

Figure 5:
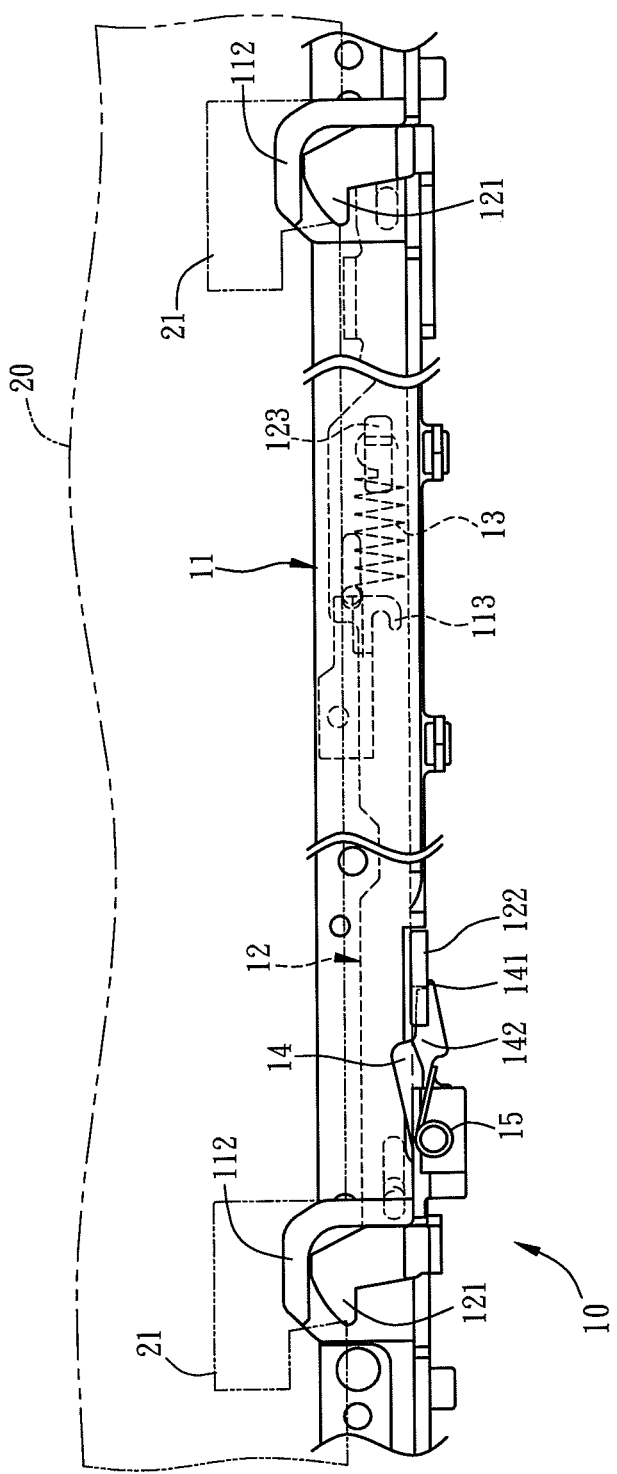
FIGS. 5-7 are schematic diagrams respectively showing the connection assembly working at different time.
Figure 6:
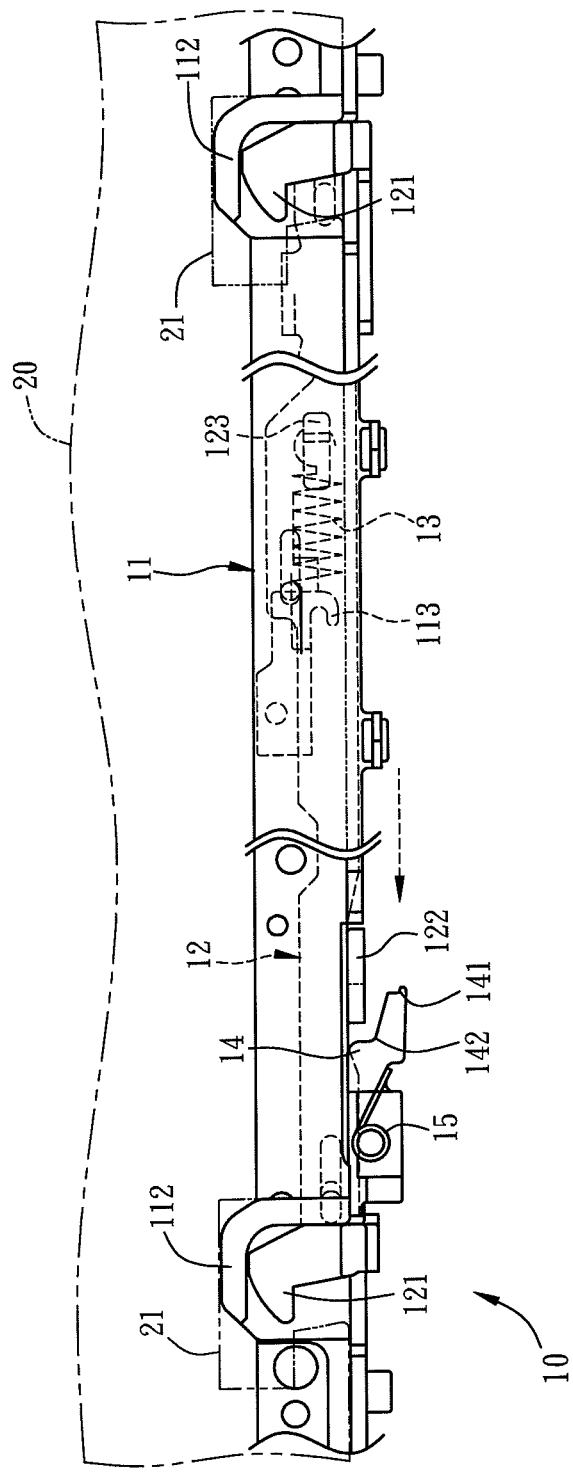
Figure 7:
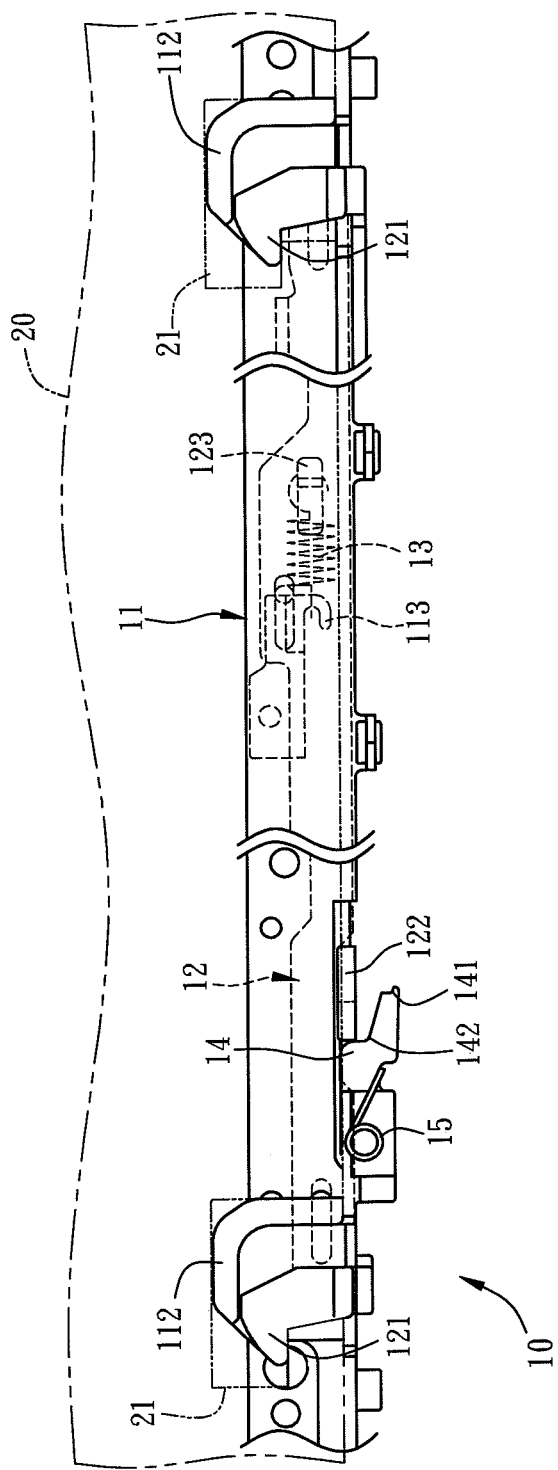

FIGS. 5-7 are schematic diagrams respectively showing the connection assembly working at different time. FIG. 5 is a schematic diagram showing the linkage element is located at the first position of the trigger element 14. FIG. 6 is a schematic diagram showing the linkage element is located at the second position of the trigger element 14. FIG. 7 is a schematic diagram showing the linkage element is located between the first position and the second position of the trigger element 14.

As shown in FIG. 5, when the electronic apparatus 20 is not connected to the dock 30, the linkage element 12 is located at a first position of the element 14, and the first elastic element 13 stores a first elastic force. In this embodiment, when the electronic apparatus 20 is not connected to the dock 30, the linkage element 12 is located at the first position of the element 14, now these engaging parts 121 are located inside these directing parts 112, and the first elastic element 13 is at a tensional state, namely, it stores an elastic force. Besides, the limiting part 122 of the linkage element 12 abuts on the first position of the trigger element 14. Specifically, in this embodiment, the trigger element 14 comprises two abutting parts 141 and 142, and when the linkage element 12 is located on the first position of the trigger element, the limiting part 122 abuts against the abutting part 141 of the trigger element 14.

As shown in FIG. 6, when the electronic apparatus 20 is connected to the dock 30, the electronic apparatus 20 presses against the trigger element 14, and engaging parts 21 of the electronic apparatus 20 are in alignment with these directing parts 112 of the bracket 11, and these directing parts 112 are located inside these engaging parts 21 of the electronic apparatus 20. Now the trigger element 14 changes the location due to an external force of the electronic apparatus 20, and pivots at the end that is fixed on the bracket 11, so that it briefly departs form the limiting part 122 of the linkage element 12 (that is the abutting part 141 of the trigger element 14 departs form the limiting part 122), meanwhile, the second elastic element 15 stores a second elastic force because of the rotation of the trigger element 14. Due to the separation of the trigger element 14 and the limiting part 122, the first elastic element 13 releases an elastic force, so that the second connecting part 123 moves to the left side of the figure with the whole linkage element 12 (only for example).

Then as shown in FIG. 7, the linkage element 12 moves to a second position of the trigger element 14, now the limiting part 122 of the linkage element 12 abuts on the abutting part 142 of the trigger element 14, and the first elastic element 13 releases a first elastic force, the second elastic element 15 stores a second elastic force. Besides, these engaging parts 121 of the linkage element 12 project these directing parts 112 and connect these engaging parts 21 of the electronic apparatus 20, such as inter-buckling.

As shown in FIG. 4, the linkage element 12 in this embodiment further comprises a control-connect part 124, it connects a control component (doesn't show in the figure), the control component exposes on the electronic apparatus 20 or the dock 30 for operation. As shown in FIG. 7, when the user wants to disconnect the electronic apparatus 20 from the dock 30, he/she can operate the control component. For example, shift the control component to the right of the figure, thus the control component makes the control-connect part 124 and the linkage element 12 right move to the first position of the trigger element 14, and these engaging parts 121 of the linkage element 12 depart from the engaging parts 21 of the electronic apparatus 20 as shown in FIG. 6. Meanwhile, the first elastic element 13 is tensioned again and stores the first elastic force, and the limiting part 122 of the linkage element 12 briefly departs from the trigger element 14, which makes the second elastic element 15 releases the second elastic force, so that the trigger element 14 rotates upwards and presses against the limiting part 122. Thus, the linkage element 12 and the limiting part 122 are located at the first position of the trigger element 14, that is, the limiting part 122 abuts on the abutting part 141 of the trigger element 14 as shown in FIG. 5.

As stated above, this embodiment further comprises a positioning mechanism which limits the movement range of the linkage element 12 between the first position and the second position. As shown in FIG. 4, in this embodiment, the bracket 11 may further comprises at least one positioning part 114, the linkage element 12 may further comprises at least one second positioning part 125. The first positioning part 114 mutually interferes with the second positioning part 125 and makes the linkage element 12 locate at the first position or the second position. In this embodiment, the first positioning part 114 comprises a convex portion, and the second part 125 comprises a slot. The convex portion slides along the slot and is limited to two ends of the slot. When the first positioning part 114 abuts against the right end of the second positioning part 125 (according to the direction of the figure), the linkage element 12 is located on the first position. When the first positioning part 114 abuts against the left end of the second positioning part 125 (according to the direction of the figure), the linkage element 12 is located on the second position. In other embodiments, the positioning mechanism may have various samples. For example, the first positioning part comprises a slot. The second positioning part comprises a convex portion. The convex portion slides along the slot. Or, the fixing mechanism can be operated via the trigger element 14 and the limiting part 122. As shown in FIG. 5, when the linkage element 14 is located at the first position, the left end and the right end of the limiting part 122 are respectively limited by the abutting part 141 of the trigger element 14 and either convex structure (doesn't show in figure) of the bracket 11; and then as shown in FIG. 7, when the linkage element 12 is located at the second position, the left end of the limiting part 122 is limited by the abutting part 142 of the trigger element 14 (the first elastic element 13 releases its elastic force, thus the right end of the limiting part 122 does not need to be limited by a convex structure of the bracket).

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A connection assembly, adapted for connecting an electronic apparatus and a dock, comprising:
    a bracket;
    a linkage element with at least one engaging part;
    a first elastic element connecting to the bracket and the linkage element;
    a trigger element having one end fixed on the bracket; and
    a second elastic element connecting to the trigger element and the bracket,
    wherein when the electronic apparatus is not connected to the dock, the linkage element is located on a first position of the trigger element, and the first elastic element stores a first elastic force, when the electronic apparatus is connected to the dock, the trigger element receives an external force so that the second elastic element stores a second elastic force, and the first elastic element releases the first elastic force to move the linkage element to a second position of the trigger element.

2. The connection assembly of claim 1, wherein the bracket further comprises at least one directing part, the engaging part hides inside the directing part when the linkage element is located at the first position of the trigger element, the engaging part projects the directing part when the linkage element is at the second position of the trigger element.

3. The connection assembly of claim 1, wherein the bracket further comprises at least one first positioning part, the linkage element further comprises at least one second positioning part, and the first positioning part mutually interferes with the second positioning part to limit the movement of the linkage element between the first position and the second position.

4. The connection assembly of claim 3, wherein the first positioning part comprises a convex portion, the second positioning part comprises a slot, the convex portion slides along the slot.

5. The connection assembly of claim 3, wherein the first positioning part comprises a slot, the second positioning portion comprises a convex part, the convex portion slides along the slot.

6. The connection assembly of claim 1, wherein the engaging part is hook-shaped.

7. An electronic system, comprising:
    an electronic apparatus;
    a dock; and
    a connection assembly connecting the electronic apparatus and the dock, comprising:
        a bracket;
        a linkage element with at least one engaging part;
        a first elastic element connecting to a first connecting part of the bracket and a second connecting part of the linkage element;
        a trigger element with one end fixed on the bracket; and
        a second elastic element connected to the trigger element and the bracket;
    wherein when the electronic apparatus is not connected to the dock, the linkage element is located at a first position of the trigger element, and the first elastic element stores a first elastic force, when the electronic apparatus is connected to the dock, the trigger element receives an external force so that the second elastic element stores a second elastic force, and the first elastic element releases the first elastic force to move the linkage element to a second position of the trigger element.

8. The electronic system of claim 7, wherein the bracket comprises at least one directing part, the engaging part hides inside the directing part when the linkage element is located at the first position of the trigger element, the engaging part projects the directing part when the linkage element is at the second position of the trigger element.

9. The electronic system of claim 7, wherein the bracket comprises at least one first positioning part, the linkage element further comprises at least one second positioning part, and the first positioning part mutually interferes with the second positioning part to limit the movement of the linkage element between the first position and the second position.

10. The electronic system of claim 9, wherein the first positioning part comprises a convex portion, the second positioning part comprises a slot, the convex portion slides along the slot.

11. The electronic system of claim 9, wherein the first positioning part comprises a slot, the second positioning part comprises a convex portion, the convex portion slides along the slot.

12. The electronic system of claim 7, wherein the engaging part is hook-shaped.

13. The electronic system of claim 7, wherein the linkage element further comprises a control-connect part, it connects a control component, the control component exposes on the electronic apparatus or the dock.

* * * * *